2,867,524

SULFATE LIQUOR TREATMENT

Melvin C. Chang, Mount Lebanon, Pa., assignor to Crucible Steel Company of America, Pittsburgh, Pa., a corporation of New Jersey No Drawing. Application July 25, 1957
Serial No. 674,052

1 Claim. (Cl. 75—.5)

This invention relates to the regeneration of acid values and the recovery of metallic iron from spent liquors containing sulfuric acid in low concentration as well as ferrous sulfate. In one aspect it relates to the treatment of waste sulfate pickle liquor. In another aspect it relates to treatment of the waste acid liquor from the production of titanium dioxide pigments.

In the production of steel, especially in rolling and finishing operations, a scale of iron oxide forms on the outer surfaces of the steel being worked which interferes seriously with further working or use of the steel. The oxide scale is removed by pickling, usually in a sulfuric acid solution. During pickling the sulfuric acid reacts with the iron oxide to form ferrous sulfate and water, and as a result the acid concentration of the bath falls off. As needed, additional acid is added to the bath. As pickling is continued a steady build-up of ferrous sulfate occurs, and eventually the bath becomes spent and must be replaced by fresh acid. Since there is little demand for ferrous sulfate, the spent liquor withdrawn from the pickling bath has for many years been considered a waste product and discarded. This liquor, however, contains several percent of sulfuric acid, usually about 5 to 10%, which of course is lost. A similarly constituted liquor is a by-product of the digestion of ilmenite ore with sulfuric acid in the production of titanium dioxide pigment.

Attempts have been made heretofore to recover acid and iron values from these waste liquors, although the iron has been isolated either as iron sulfate crystals, or as iron oxide through a two-step exchange-oxidation process. In the latter process, an additional or third step is of course required if the iron is to be recovered in metallic form.

In accordance with the present invention, there is provided a two-step process whereby sulfuric acid is regenerated and the iron values in the spent liquor are converted to finely divided powdered metallic iron. Specifically, the waste liquor containing sulfuric acid, ferrous sulfate and water is first contacted with a gaseous chlorinating agent which reacts with the ferrous sulfate to form additional sulfuric acid and ferrous chloride, which precipitates in the acid medium. In the second step the ferrous chloride is contacted with a gaseous reducing agent, which converts the same to metallic iron with simultaneous production of the gaseous chlorinating agent, and the latter is recirculated to the initial step of the process. The resulting iron powder is of a grade suitable for use in powder metallurgy processes.

The preferred chlorinating agent in accordance with the present invention is hydrogen chloride, and the preferred reducing agent gaseous hydrogen. The reactions occuring are thus as follows:

$$FeSO_4 + 2HCl_{(g)} \rightarrow FeCl_2\downarrow + H_2SO_4 \quad \text{(Step 1)}$$

and in the reduction:

$$FeCl_2 + H_2 \rightarrow Fe + 2HCl_{(g)} \quad \text{(Step 2)}$$

The HCl gas produced in the second step is recycled and employed as the chlorinating agent in the first step. The present process contemplates the use of by-product hydrogen, as from a coal hydrogenation plant for example, for the reduction operation. Also coke oven gas which usually contains about 50% hydrogen by volume as well as some carbon monoxide may be employed. Thus it can be seen that the present process is not restricted to the use of substantially pure hydrogen. While pure hydrogen offers obvious advantages, it is costly to produce, and the process may be carried out entirely satisfactorily with the above relatively cheap hydrogen.

In place of the preferred gaseous hydrogen chloride chlorinating agent and hydrogen reducing agent, the present invention also contemplates the use of carbonyl chloride as the chlorinating agent and carbon monoxide as the ferrous chloride reducing agent. In these circumstances the reactions are as follows:

$$FeSO_4 + H_2O + COCl_{2(g)} \rightarrow FeCl_2\downarrow + H_2SO_4 + CO_{2(g)} \quad \text{(Step 1)}$$

and $$FeCl + CO_{(g)} \rightarrow Fe + COCl_{2(g)} \quad \text{(Step 2)}$$

The carbonyl chloride produced in the second step is of course recycled for chlorination of the ferrous sulfate-containing waste liquor.

When coke oven gas, for example, is employed as the source of the reducing agent reduction will for the most part be effected by hydrogen, but the carbon monoxide will also react with the ferrous chloride. The off gases then contain hydrogen chloride and carbonyl chloride, which mixture is recycled to the chlorinating step. The present invention thus contemplates the use of mixed reducing gases, as hydrogen and carbon monoxide.

The spent liquor which will generally contain between about 5 and 10% by weight of sulfuric acid and about 12 to 20% by weight of ferrous sulfate is preferably concentrated by evaporation prior to chlorination in order that the sulfuric acid concentration be sufficiently high to assure precipitation of the ferrous chloride being produced. Alternatively, the liquor may be concentrated following chlorination to precipitate the ferrous chloride. Elimination of water either before or after chlorination of course reduces the amount of evaporation required to concentrate the sulfuric acid from the first step to the desired degree prior to recirculation to the pickling bath or ore digesting process. The chlorinating agent is desirably bubbled through the spent liquor which results in conversion of the ferrous sulfate to insoluble ferrous chloride. The sulfuric acid initially present in the liquor and that which is produced during chlorination is separated from the solid ferrous chloride by any suitable means such as filtration, and preferably by centrifuging. By recovering sulfuric acid in this fashion and recirculating the same to the pickling bath, for example, the make-up sulfuric acid requirements are reduced to the few percent inevitably lost by drag out.

Following its separation from the chlorinated liquor, the precipitated ferrous chloride is contacted with the gaseous reducing agent at a temperature between about 900 and 1700° F., and preferably at about 1000–1300° F. The gaseous chloride product of reduction is easily separated from the resulting metallic iron and recycled to the first or chlorinating step of the process.

While the invention has been described in detail with respect to certain preferred embodiments, it will be understood by those skilled in the art that various changes and modifications can be made without departing from the spirit and scope of the invention as defined in the appended claim.

What is claimed is:

In the pickling of steel, a cyclic process for regenerating the acid values in the spent liquor from the pickling bath and producing finely divided iron powder therefrom, with consumption of a gaseous reducing agent only, which comprises the steps of contacting the ferrous sulfate and sulfuric acid containing spent pickle liquor with a gaseous chlorinating agent selected from the group consisting of hydrogen chloride, carbonyl chloride and mixtures thereof to form additional sulfuric acid and a ferrous chloride precipitate, separating the ferrous chloride precipitate from the more concentrated sulfuric acid solution, recirculating the acid solution to the pickling bath, contacting the separated ferrous chloride precipitate with a gaseous reducing agent selected from the group consisting of hydrogen, carbon monoxide, coke oven gas and mixtures of hydrogen and carbon monoxide between about 900 and 1300° F. to form iron powder and the aforementioned gaseous chlorinating agent, recirculating the chlorinating agent to the pickle liquor treating step, and removing the iron powder from the system.

References Cited in the file of this patent

UNITED STATES PATENTS

| 2,663,633 | Crowley et al. | Dec. 22, 1953 |
| 2,664,352 | Darner et al. | Dec. 29, 1953 |
| 2,701,761 | Crowley | Feb. 8, 1955 |
| 2,760,700 | Brooks | Sept. 11, 1956 |

OTHER REFERENCES

Gray: "Reuse Waste Pickling Liquors," Steel, April 27, 1953, pages 130 and 133; page 133, left column relied upon.